Jan. 7, 1964
HIDEO TATIBANA
3,116,853
APPARATUS FOR FILLING BOTTLES WITH METERED QUANTITIES OF LIQUID
Filed April 24, 1962
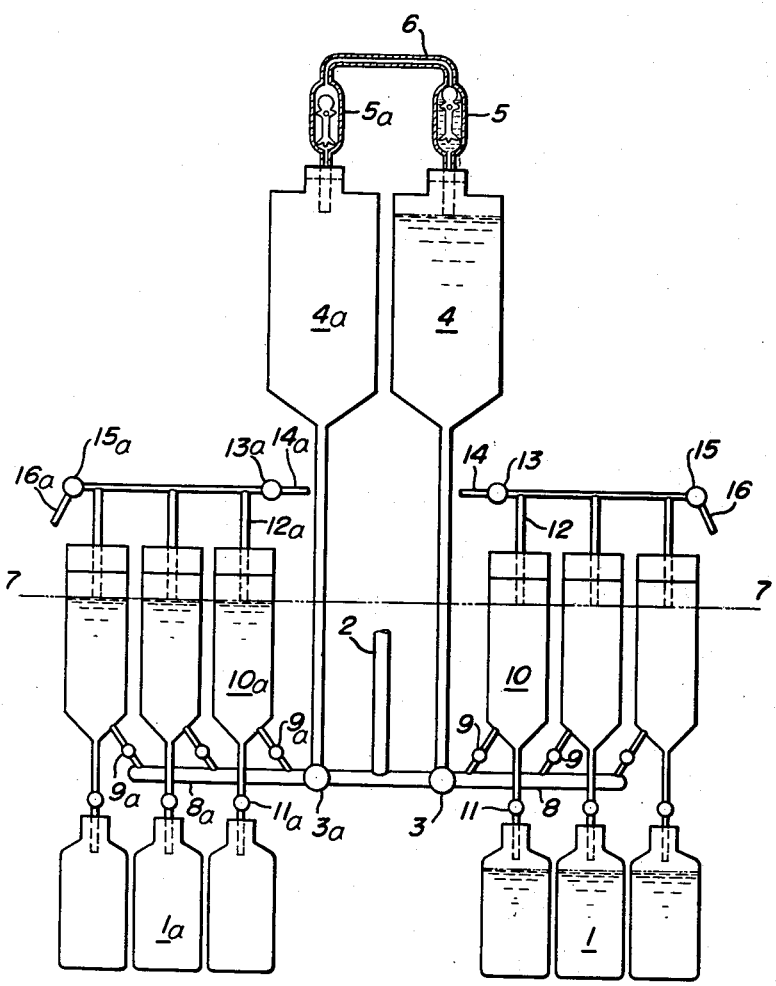

United States Patent Office

3,116,853
Patented Jan. 7, 1964

3,116,853
APPARATUS FOR FILLING BOTTLES WITH METERED QUANTITIES OF LIQUID
Hideo Tatibana, 23 Showadori-2-chome Nakano-ku, Tokyo, Japan
Filed Apr. 24, 1962, Ser. No. 189,802
3 Claims. (Cl. 222—68)

The present invention relates to apparatus for bottling liquids and has for an object to provide an improved bottling apparatus adapted to fill a predetermined number of bottles arranged in a row simultaneously with a predetermined quantity of liquid for each of such bottles with rapidity and accuracy.

A specific object of the present invention is to provide an improved bottling apparatus comprising a pair of bilaterally arranged filling sections adapted to operate alternately to fill a set of a predetermined number of bottles simultaneously with a predetermined quantity of liquid for each of such bottles with rapidity and accuracy.

Other objects and advantages of the present invention will be apparent from the following description when read with reference to the accompanying drawing, which represents a schematic front view of one embodiment of the present invention.

In the drawing, the liquid from a reservoir (not shown) is fed through a liquid supply conduit 2 into either of the metering vessels 4, 4a under pressure. The metering vessels 4, 4a each have a float valve 5 extending downwardly into the vessel through a plug tightly fitted in its top opening and are adapted to hold a predetermined quantity of liquid to be filled in a set of a predetermined number of bottles 1. As shown, the metering vessels 4, 4a are disposed above other component parts of the apparatus and are connected at the bottom thereof through respective switching valves 3 and 3a with a supply conduit 2 and with a distributor pipe 8 lying below a predetermined level 7. As observed in the drawing, the bottling apparatus has a pair of bilaterally arranged right and left filling sections, like members of the two sections carrying like reference numerals with suffix *a* attached to those of the left-hand section, and the following description of one of the two sections applies equally to the other section.

The distributor pipe 8 is connected by way of respective stop valves 9 with the bottom of a number of measuring cylinders 10 each sized to hold substantially a predetermined quantity of liquid when filled up to a predetermined level 7. More specifically, each of the measuring cylinders 10, is connected at the bottom thereof with a delivery pipe having a stop valve 11, is dimensioned to hold a predetermined quantity of liquid to be filled in a single bottle between the predetermined level 7 and the stop valve 11. Also, each of the measuring cylinders 10 has a plug tightly fitted in its top opening with a narrow pipe 12 extending downwardly through the plug into the cylinder to open at the predetermined level 7. The narrow pipes 12 are connected at the top thereof with an air inlet conduit 14 by way of a stop valve 13 and with an air outlet conduit 16 by way of a stop valve 15. The float valves 5 and 5a cooperating with the respective metering vessels 4 and 4a communicate at the top with each other through a connector pipe 6 so that the right and left filling sections of this apparatus may operate alternately as will be described in detail hereinafter.

In operation of the apparatus, the switching valve 3 is opened to the supply conduit 2 and the metering vessel 4, and the switching valve 3a is opened to the metering vessel 4a and the distributor pipe 8a while the stop valves 9a and 15a are opened all of the remaining stop valves remaining closed. Then the liquid from the reservoir (not shown) is fed through the supply conduit 2 into the metering vessel 4 under pressure while expelling the air from the system to the exterior of the apparatus through the stop valve 15a until the liquid level in the vessel 4 reaches the float valve 5 extending through the plug fitted in the top opening of the vessel, when the vessel 4 holds a predetermined quantity of liquid just sufficient to fill a set of bottles 1 arranged below.

Next, the switching valve 3 is turned to connect the metering vessel 4 with the distributor pipe 8, the stop valves 9 and 15 are opened and the stop valves 11 and 13 closed. At the same time the switching valve 3a is turned to interconnect the supply conduit 2 and the metering vessel 4a while closing the stop valves 9a and 15a and opening the valves 11a and 13a. The liquid from the reservoir (not shown) is now allowed to rise into the metering vessel 4a through the supply conduit 2 until the liquid level in the vessel reaches the float valve 5a at the top so that the vessel 4a holds a predetermined quantity of liquid sufficient to fill another set of bottles 1 arranged below. Meanwhile the air in the metering vessel 4a is forced through the connector pipe 6, which interconnects the tops of the float valves 5 and 5a, into the opposite metering vessel 4. On this occasion, the body of air sealed between the liquid levels in the respective vessels is temporarily compressed to a slight extent so that a part of the liquid in the vessel 4 corresponding to that extent of compression is forced rapidly into the measuring cylinders 10 communicating with each other in a siphon fashion, all the remaining liquid in the vessel 4 flowing into the cylinders 10 in a more or less extended period of time. During this period any differences in liquid level between the cylinders are reduced gradually to form levels substantially equal to each other. In addition to this, after the liquid level in each of the measuring cylinders 10 has reached the bottom opening of the narrow pipe 12 extending through the plug tightly fitted in the top opening of the cylinder, the ascent of the liquid in the narrow pipe 12 is subjected to the frictional resistance of the inner wall thereof and thus is slowed down. Moreover, any difference in level of the liquid rising through the narrow pipes 12 represents only a slight difference between the liquid quantities held in the respective cylinders. Under these circumstances, it will be appreciated that the mass of liquid entering the measuring cylinders communicating with each other in a siphon fashion is balanced comparatively rapidly to come to rest forming liquid levels in the respective cylinders 10 coinciding with the predetermined level 7. In this manner, the cylinders 10 are filled with liquid of the same predetermined quantity measured above the level of respective stop valves 11 arranged in the delivery pipes of the cylinders.

Now, the first step of operation as previously referred to is once again started. The switching valve 3 is turned again to interconnect the measuring vessel 4 and the supply conduit 2 while closing the stop valves 9 and 15 and opening the stop valves 11 and 13, and at the same time the switching valve 3a is turned to communicate the metering vessel 4a with the distributor pipe 8a while opening the stop valves 9a and 15a and closing the stop valves 11a and 13a. By doing this, the liquid from the reservoir is now allowed to enter the metering vessel 4 to rise therein until the liquid level in the vessel reaches the float valve 5 to fill the vessel with a predetermined quantity of the liquid. Meanwhile, the liquid in the metering vessel 4a is forced down by the air coming from the metering vessel 4 to fill the set of measuring cylinders 10a connected with each other in a siphon fashion each with a predetermined quantity of liquid forming levels in the respective cylinders coinciding with said predetermined level 7. Simultaneously with this, the quantities of liquid previously filled in the respective measuring cylinders 10 above the stop valves 11, which are arranged in the delivery pipes connected to the bottom of the respective cylinders 10, are transferred simultaneously into the respective bottles 1 arranged immediately below the cylinders 10 under pressure of the air blowing into the cylinders through the respective narrow pipes 12 communicating through the stop valve 13 with the air inlet conduit 14, as shown in the drawing.

Now the second step of operation as previously referred to herein follows. The switching valve 3 is turned again to connect the metering vessel 4 with the distributor pipe 8 while opening stop valves 9, 15 and closing stop valves 11, 13, and at the same time the switching valve 3a is turned to communicate the supply conduit 2 with the metering vessel 4a while closing the stop valves 9a, 15a and opening the stop valves 11a, 13a. By doing this, the liquid is allowed to flow through the supply conduit 2 into the metering vessel 4a until the latter is filled with a predetermined quantity of liquid to fill a set of bottles 1 arranged below. At the same time, the previously metered quantity of liquid in the metering vessel 4 is transferred to the measuring cylinders 10 to fill the latter to said predetermined level 7. On this occasion, the respective quantities of liquid held in the measuring cylinders 10a are transferred simultaneously into the set of bottles 1 arranged immediately below the cylinders 10a under pressure of the air blowing into the latter through the respective narrow pipes 12a, which are connected through the stop valve 13a with the air inlet conduit 14a as described hereinbefore.

It will be understood that the first and second steps of operation described above are performed alternately to fill at each step a set of a predetermined number of bottles with a predetermined quantity of liquid for each of such bottles with rapidity and accuracy.

Although but one embodiment of the present invention has been illustrated and described, it will be apparent to those skilled in the art that various changes and modifications may be made therein without departing from the spirit of the invention or from the scope of the appended claims.

What is claimed is:

1. Apparatus for filling containers from a liquid reservoir with measured quantities of liquid, said apparatus comprising: a pair of bilaterally arranged filling sections, each comprising a measuring vessel located uppermost in said sections, measuring cylinders supported at a common level beneath the measuring vessel, a distributor pipe located beneath said cylinders and connected thereto for feeding said cylinders with liquid, liquid feeding means adapted for connection with said reservoir to alternately feed each of said measuring vessels of the respective filling sections with preestablished quantities of liquid, means for feeding the liquid in said vessels to the respective distributor pipes of each section and thereby to the measuring cylinders thereof in alternation with the feeding of the vessels themselves so that as one of the vessels is being fed with liquid the other of the vessels is feeding liquid to said cylinders, each said cylinder being adapted for discharging the liquid therein to a container placed beneath the cylinder, means comprising a pipe opening into each of said cylinders at the top thereof for allowing the flow of air to and from said cylinders, said pipes all opening into said cylinders at a common level, and a connecting pipe between said vessels for allowing air to be expelled from the vessel being filled with liquid to the vessel which is feeding the liquid therein to the associated cylinders whereby said air promotes the feeding of the liquid to the associated cylinders.

2. Apparatus as claimed in claim 1 wherein said pipes opening into each of the cylinders are relatively narrow compared to the cylinders.

3. Apparatus for filling containers from a liquid reservoir with measured quantities of liquid, said apparatus comprising: a liquid supply conduit adapted for connection with said reservoir, a pair of bilaterally arranged filling sections each comprising a measuring vessel, a float valve extending downwardly towards said vessel, said measuring vessel and associated float valve being located uppermost in the respective section and being connected with said supply conduit which is located below said vessels, a distributor pipe for each vessel located below said vessels and connected to the supply conduit, a switching valve between each of said vessels and the associated said distributor pipe for alternately feeding liquid from said supply conduit to the vessel and liquid from the vessel to the distributor pipe, a plurality of measuring cylinders for each filling section located above the distributor pipe for said section and connected thereto, valves between the cylinders and the distributor pipes, delivery pipes for said cylinders adapted to feed containers located below the cylinders, said cylinders all being supported at a common elevation and each having a volume below a predetermined level which is equal to the quantity of liquid to be fed into the containers, stop valves on said delivery pipes at a level such that each measuring cylinder will hold said predetermined quantity of liquid between said predetermined level and the level of said stop valves, plugs tightly fitted in the cylinders, narrow pipes extending downwardly into said measuring cylinders through said plugs to open into respective cylinders at said predetermined level, an air inlet conduit connected to said narrow pipes, a first stop valve on said inlet conduit, an air outlet conduit connected to said narrow pipes, a second stop valve on said outlet conduit, and a connecting pipe connecting said two sections, said float valves in the respective measuring vessels of the two sections communicating with each other through said connecting pipe to allow the two sections to operate alternately, whereby the liquid from the reservoir may first enter into one of the measuring vessels through the liquid supply conduit to fill said one measuring vessel with a predetermined quantity of liquid and then enter the other of the vessels while the first vessel discharges the liquid therein to the cylinders and then to the containers.

References Cited in the file of this patent

UNITED STATES PATENTS

| 868,023 | Simpson | Oct. 15, 1907 |
|---|---|---|
| 1,218,925 | Bruce | Mar. 13, 1917 |
| 1,657,792 | Drees | Jan. 31, 1928 |
| 1,925,592 | Kleucker | Sept. 5, 1933 |

FOREIGN PATENTS

| 54,403 | Austria | July 25, 1912 |
|---|---|---|
| 241,583 | Great Britain | July 15, 1926 |
| 274,010 | Great Britain | July 14, 1927 |
| 676,641 | France | Feb. 25, 1930 |